(12) United States Patent
Ford et al.

(10) Patent No.: US 6,480,830 B1
(45) Date of Patent: Nov. 12, 2002

(54) ACTIVE CALENDAR SYSTEM

(75) Inventors: Daniel Alexander Ford; Tobin Jon Lehman, both of Los Gatos; Qi Lu, San Jose, all of CA (US); Udi Manber, Tucson, AZ (US); Ron Yair Pinter, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/049,661

(22) Filed: Mar. 27, 1998

Related U.S. Application Data

(63) Continuation of application No. 09/049,661, filed on May 27, 1998.
(60) Provisional application No. 60/072,956, filed on Jan. 29, 1998.

(51) Int. Cl.$^7$ .............................................. G06F 17/00
(52) U.S. Cl. .......................................................... 705/9
(58) Field of Search .......................... 705/9, 5, 14, 26, 705/27; 345/963

(56) References Cited

U.S. PATENT DOCUMENTS

| | | | | |
|---|---|---|---|---|
| 4,162,610 A | | 7/1979 | Levine | 58/148 |
| 4,489,958 A | * | 12/1984 | Martin | 283/3 |
| 4,630,934 A | * | 12/1986 | Arber | 368/28 |
| 4,708,490 A | * | 11/1987 | Arber | 368/28 |
| 4,831,552 A | * | 5/1989 | Scully et al. | 364/518 |
| 5,070,470 A | * | 12/1991 | Scully et al. | 364/705.08 |
| 5,261,045 A | * | 11/1993 | Scully et al. | 395/161 |

(List continued on next page.)

FOREIGN PATENT DOCUMENTS

JP          409097226 A    *    4/1997

OTHER PUBLICATIONS

Derwent—Acc.No.: 1990–077033; Inoue, F. et al, Mar. 1990.*

"TimeWeaver . . . the intelligent personal manager", from http://www.quaartz.com/product/index.html, printed on Oct. 13, 1999.

(List continued on next page.)

*Primary Examiner*—Hyung-Sub Sough
*Assistant Examiner*—Pierre E Elisca
(74) *Attorney, Agent, or Firm*—Dan Hubert & Assoc.

(57) ABSTRACT

An "active" calendar automatically analyzes a user's calendar entries and sends machine-readable messages to destinations appropriate to content of the calendar entry. A group of event categories is established, each category specifying one class of anticipated calendar entry. An action rule database pre-associates each event category with one or more message formats each having a content and a destination. The action rule database also contains data identifying sources containing the content and destination for each message format. These sources include records of the action rule database itself, subparts of calendar entries of the pre-associated event category, one or more other databases, or a combination of the foregoing. After the calendar receives a user-submitted computer calendar entry describing a planned event, it identifies one of the event categories of the established group that classifies the planned event. For each message format pre-associated with the identified event category, the calendar determines the content and destination for the message as specified by the action rule database, and transmits the message to the destination.

39 Claims, 5 Drawing Sheets

U.S. PATENT DOCUMENTS

| | | | | | |
|---|---|---|---|---|---|
| 5,317,683 | A | * | 5/1994 | Hager et al. | 395/145 |
| 5,428,784 | A | * | 6/1995 | Cahill, Jr. | 395/650 |
| 5,601,432 | A | * | 2/1997 | Bergman | 434/118 |
| 5,664,063 | A | * | 9/1997 | Johnson et al. | 395/101 |
| 5,790,974 | A | | 8/1998 | Tognazzini | 701/204 |
| 5,842,009 | A | | 11/1998 | Borovoy et al. | 395/601 |
| 5,855,006 | A | * | 12/1998 | Huemoeller et al. | 705/9 |
| 5,867,822 | A | | 2/1999 | Sankar | 705/8 |
| 5,960,406 | A | | 9/1999 | Rasansky et al. | 705/9 |
| 6,016,478 | A | * | 1/2000 | Zhang et al. | 705/9 |

OTHER PUBLICATIONS

"Connecting With Timeweaver," from http://www.adsections.businessweek.com/toshiba/timeweaver.htm, printed on Oct. 13, 1999.

Andrew Anker et al., "We interrupt this magazine for a special bulletin . . . ", Wired Magazine, Mar. 1997.

Udi Manber et al., "The Search Broker", USENIX Symposium on Internet Technologies and Systems, Dec. 8–11, 1997, pp. 231–239.

Tom Mitchell et al., "Experience with a Learning Personal Assistant", Communications of the ACM, Jul. 1994, vol. 37, No. 7, pp. 81–91.

"Actioneer (tm) for Windows—The Action Message Manager for the 3Com Palm Pilot (tm) . . . ", from http://www.actioneer.com/products/products.htm, copyright dated 1997.

Grossner et al., "Personal Assistants for the Office Professional", Intelligence Artificielle au Canada, Autumn 1996, pp. 34–38.

* cited by examiner

ACTIVE CALENDAR SYSTEM

This application Ser. No. 09/049,661 filed May, 27, 1998 is a continuation of a Provisional Application No. 60/072,956, filed Jan. 29, 1998.

BACKGROUND OF THE INVENTION

1. Field of the Invention

The present invention relates to computerized personal calendars and planning programs. More particularly, the invention concerns an "active" calendar that automatically generates and sends machine-readable messages in support of calendar entries. As an example, the calendar may analyze the user's calendar entries, search predefined sources for information related to the user's entries, filter the search results, and link this the filtered results to the calendar entry, thereby aiding the user in his/her calendared activity.

2. Description of the Related Art

Boosted by improvements in computer technology, the information age has truly arrived. In a matter of minutes, a computer user can easily garner the latest stock quotes, peruse local real estate listings, and obtain satellite weather images. Due to this explosion of available information, it is even more important to have effective means for conducting research, storing personal data, disseminating information, and performing other data management tasks. Engineers and programmers have addressed this condition by developing a myriad of different software and hardware products.

One type of information-related product is the "personal information manager." Typically, a personal information manager is a software program that runs on a user's personal computer. The software assists the user in managing various personal information, such as a "to do" list, personal calendar, address list, etc. One example is the LOTUS ORGANIZER product, commercially available from INTERNATIONAL BUSINESS MACHINES CORP. ("IBM"). Another example is the PILOT DATEBOOK product from 3COM. Personal information managers assist their users in entering desired information, and then organizing and managing the information. However, these programs do not contribute toward gathering information for the user. The only data contained in a personal information manager is that entered by its user. Unfortunately, much of the information that would be important to the user, and which is directly related to the calendar information, is generated elsewhere, and the user may lack the time and expertise to collect, organize, and filter the data.

In contrast, applications with "push technology" focus upon the automatic delivery of information to users. Applications with push technology deliver information from a source such as the public Internet based upon a profile previously completed by the user. One example is the POINTCAST software program, in which a user enters his/her preferences in areas of stocks, sporting events and teams, world news, local news, weather, etc. When the user's computer is connected to the public Internet, the POINTCAST program automatically gathers information compatible with the user's profile, according to a predetermined schedule. This information may be relayed to the user, for example, by automatically displaying the information on the user's monitor during dormant times. Although this style of data collection is beneficial to many, it is narrowly tailored to situations where a user has a longstanding interest in a particular class of information, and the information tends to change frequently, e.g., news.

One more sophisticated type of information gathering facility is known as "agent technology." Applications using agent technology provide a sophisticated active search engine, which is particularly configured to the user's specifications. Applications with agent technology use intelligent code that is run by Internet web servers, gathering data by migrating among many web sites and processing information found there. One implementation of agent technology is present in IBM's products that incorporate "AGLET TECHNOLOGY." Although agent technology constitutes a significant advance that may be particularly useful for thoroughly researching a few topics, it is not specifically suited to completing a large number of minor information gathering tasks.

In view of the foregoing limitations of known products, they are not completely adequate for some applications that would benefit from having certain features of different products.

SUMMARY OF THE INVENTION

Broadly, the present invention concerns an "active" calendar that automatically performs various user-defined tasks appropriate to calendar entries. Chiefly, the active calendar transmits user-defined messages in support of the calendar entries. The message may comprise internet search requests, e-mail messages, print requests, internal computer commands, or any other machine-readable message helpful to the user's calendar entry. As a more particular example, the calendar may analyze the user's calendar entries, search predefined sources for information related to the user's entries, filter the search results, and link the search results to the calendar entry, thereby aiding the user in his/her calendared activity.

In advance of any calendar entries, the active calendar establishes a group of categories for use with calendar entries. Each category is associated with a particular planned event, such as shopping, teleconference, phone call, travel, meeting, child's activity, etc., and may be extended by the user. For each different category, there is a predetermined set of one or more subcategories. For a travel event, the associated subcategories may include source, destination, departure time, and arrival time.

An action rule database pre-associates each event category with one or more message formats, each representing a message to be sent in support of calendar entries of that event category. Each message format has a content and a destination, information for which is obtained from the calendar entry itself, the action rule database, or a combination of the two.

Possible message destinations include internet sites such as search engines, e-mail addresses, printers, internal computer components, or any other computing component capable of aiding the user's calendar entry. Message content may comprise search parameters (for an internet search), executable code (for a computer component), a text message (for an e-mail message), etc.

Search engines are one example of a message destination specified by the action rule database, the message content being taken from the calendar entry itself. Search engines, or other information sources, are specified by the action rule database for use with particular message formats if these sources are likely to contain information helpful to the user in regard to calendar entries of this event category. For instance, with a travel event category, beneficial sources of information might include Internet sites with weather forecasts, restaurant and hotel listings, maps, current event information, and other helpful information; this information is customized according to the calendar entry by using the contents of the subcategory "destination city" as a search parameter. In addition to Internet sites, other information sources may include the user's personal address book, e-mail archive, and various databases on the user's hard drive, such as company databases and any other information imaginable. In contrast to the information sources, the message destinations comprise destinations for machine-readable messages that may be sent in support of the calendar entry. Such destinations may include e-mail addresses, printers, internal computer components, networked computers, or other useful locations.

The user submits a calendar entry to a computer, such as the user's personal computer. The entry may be made, for example, using a graphical user interface ("GUI"). The entry describes a planned event, such as a teleconference, meeting, travel, etc. The active calendar processes the calendar entry on an appropriate basis, such as immediately, periodically, at predetermined activation times, or a predefined time before an event. First, the active calendar determines which one of the predetermined group of categories the entry pertains to. The entry may also be parsed into a number of fields, each associated with a different one of the subcategories predefined for the determined category. This parsing may be performed by receiving user-selected fields (if the fields are user-selected), or by using word association technology or another suitable analytical technique (if the fields are not specifically designated by the user).

Next, the active calendar constructs and sends messages of each prescribed message format pre-associated with the current event category. First, the content and destination of a message are determined according to the action rule database. The action rule database may specify the actual data itself (e.g., which internet search engine to use), or it may point to appropriate fields of the calendar entry for such data (e.g., which search parameters to use). After constructing the message, the active calendar sends the message to the destination. In the case of information searches, further action may entail filtering results of the search, optionally copying some or all of the results to local storage, and presenting the results to the user by linking them to the user's calendar entry. Thus, the present invention's active calendar stores calendar entries normally input by the user, but it also automatically acts on information in the calendar entries by sending appropriate messages. In the case of an internet search, the active calendar acts by predicting additional information needed, and searching and retrieving the information from a multitude of sources. The active calendar may also organize the information and present it to the user. Considering an example involving a travel event category, the active calendar may update weather and traffic information for the destination city, fetch the telephone and fax numbers of people the user is scheduled to meet with, advise the user of important events in the destination city, provide driving directions, etc. As a different example, the active calendar may automatically generate and send an e-mail to the user's spouse whenever the user's calendar reflects plans to work late. When a meeting is calendared, reminder messages may be e-mailed to all meeting participants several minutes before the meeting. Furthermore, prior to the meeting, the active calendar may automatically collect and organize information about the meeting participants, and retrieve notes and minutes from prior meetings. Advantageously, the user can conveniently customize which actions are taken for different types of calendar entries.

As shown above, then, one embodiment of the invention is a method to supplement entries of a computerized personal calendar by obtaining additional data and/or transmitting messages appropriate to the calendar entries. A different embodiment of the invention, however, concerns an apparatus, such as a digital data processing machine, programmed to supplement entries of a computerized personal calendar. In still another embodiment, the invention may be implemented to provide a signal-bearing medium tangibly embodying a program of machine-readable instructions executable by a digital data processing apparatus to perform method steps for supplementing computerized personal calendar entries.

The invention affords its users with a number of distinct advantages. First, in contrast to "push" technology, where the user has a longstanding interest in a particular subject (such as a particular group of stocks or a sports team), the active calendar is especially useful to obtain an eclectic assortment of information concerning diverse activities. As a further advantage, the invention permits the user to participate in active calendaring, requiring little or no action by the user beyond normal calendar entry tasks. The invention also provides a number of other advantages and benefits, which should be apparent from the following description of the invention.

DETAILED DESCRIPTION

The nature, objects, and advantages of the invention will become more apparent to those skilled in the art after considering the following detailed description in connection with the accompanying drawings. As mentioned above, the invention concerns an "active" calendar that automatically performs user-defined tasks appropriate for calendar entries. For example, the calendar may analyze a user's calendar entries, search predefined sources for information related to the user's entries, filter the search results, and link this data to the calendar entry, thereby aiding the user in his/her calendared activity. Facility is also provided to transmit messages to predefined recipients, to supplement the user's calendar entries.

HARDWARE COMPONENTS & INTERCONNECTIONS

Active Calendar System

Figure 1:
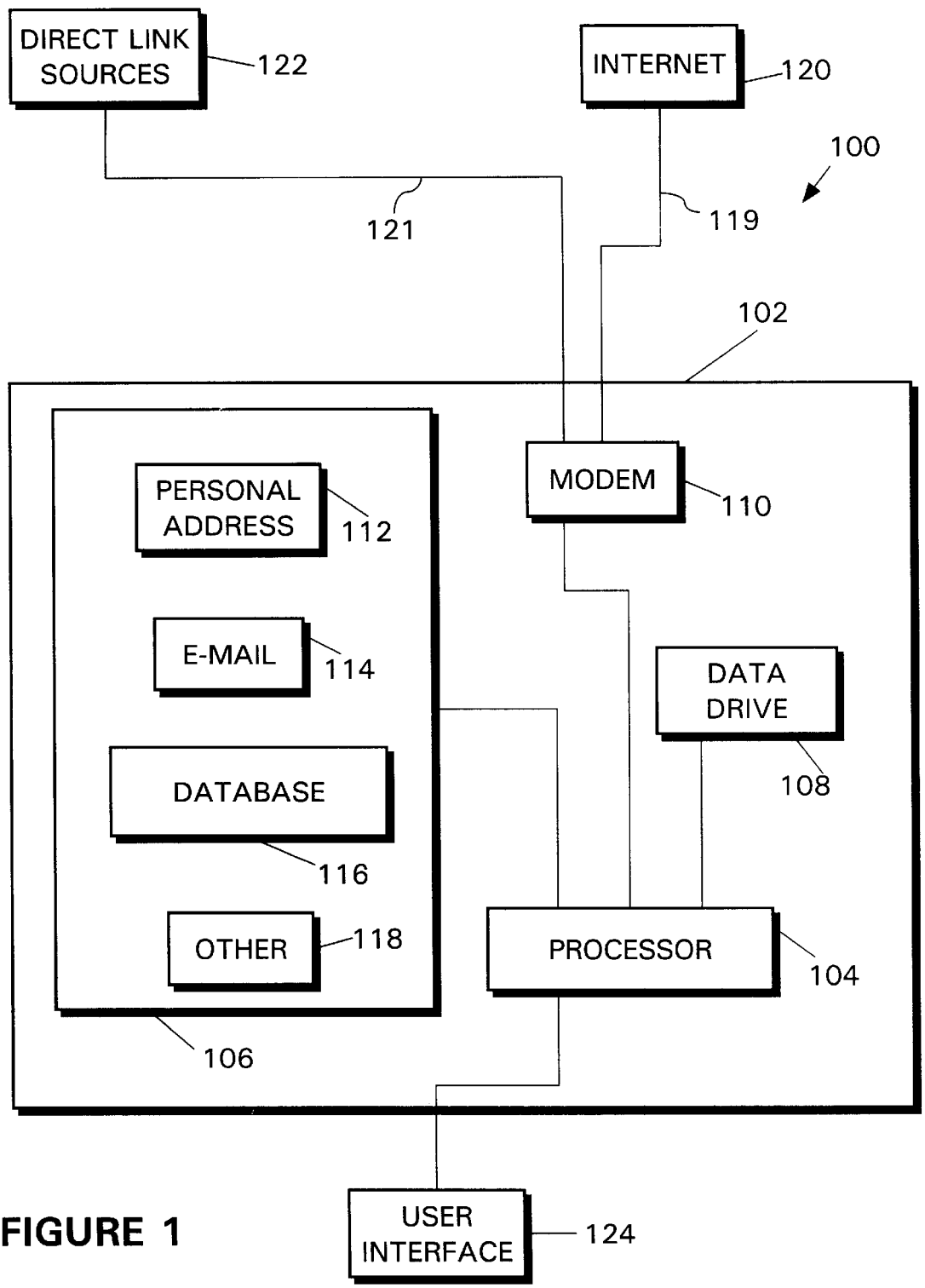
FIG. 1 is a block diagram of the hardware components and interconnections of an active calendar system in accordance with the invention.

One aspect of the invention concerns an active calendar system, which may be embodied by various hardware components and interconnections as described in FIG. 1. The overall system 100 utilizes a computer 102, the Internet 120, various direct link sources 122, and a user interface 124. The computer 102 includes a processor 104, storage 106, modem 110, and data drive 108. Broadly, the processor 104 runs a unique personal calendar program that actively performs user-defined tasks to supplement its calendar entries. Chiefly, these tasks involve generating machine-readable messages and sending the messages to various destinations. As a specific example, this may involve an information search, conducted by sending messages containing search parameters to various sources such as the Internet 120, various direct link sources 122, the storage 106, the data drive 108, the user interface 124, etc.

The computer 102 may comprise a personal computer, mainframe computer, workstation, or any other suitable arrangement of one or more computing devices. As a specific example, the computer 102 may comprise an IBM brand computer, such as a PS/2 computer. The processor 104 comprises a microprocessor or another suitable digital data processing machine, as discussed in greater detail below. The storage 106 constitutes non-volatile storage, such as hard disk drive, tape, battery supported random access memory, or any other suitable device for storing digital data. In the illustrated example, the storage 106 includes various subcomponents, including a personal address book 112, e-mail list 114, and another database 116 such as a corporate database. Other components 118 may be included as well.

The computer's data drive 108 represents a removable media drive, such as an optical disk drive, diskette drive, tape cartridge drive, high capacity ZIP drive, etc. The computer's modem 110 may be implemented by one or more telecommunication devices suitable to interface with the appropriate remote information sources. For example, the modem 110 may comprise a telephone modem, cable television modem, ISDN modem, interface, ETHERNET card, etc. As illustrated, the modem 110 comprises a telephone modem such as a U.S. ROBOTICS 56.K SPORTSTER brand modem.

As mentioned above, the processor 104 provides a personal calendar that is augmented by message exchange with one or more remote sources, such as the Internet 120, various direct link sources 122, other components attached or internal to the computer 102, etc. The Internet 120 includes file transfer protocol ("FTP") sites, worldwide web ("WWW") sites, gopher sites, and any other information sources of the Internet. The direct link sources 122 may include bulletin boards ("BBS"), corporate intranets, and other sources reachable by direct telephone, local or wide area network, or another telecommunications link. As exemplified in FIG. 1, the Internet 120 represents the public Internet. As an alternative, the Internet 120 may instead comprise a private enterprise internet ("corporate internet") or a combination of public and private Internet. The sources 120, 122 are coupled to the modem 110 by communication links 119, 121, such as telephone lines, ISDN lines, fiber optic lines, direct "hardwired" connections, wireless link, television cable, etc.

Exemplary Digital Data Processing Apparatus

Apart from the system 100 of FIG. 1, another aspect of the invention is a digital data processing apparatus, programmed to operate an active calendar according to the invention. This apparatus may be embodied by various hardware components and interconnections, and may be implemented in the form of the processor 104, for example.

Figure 2:
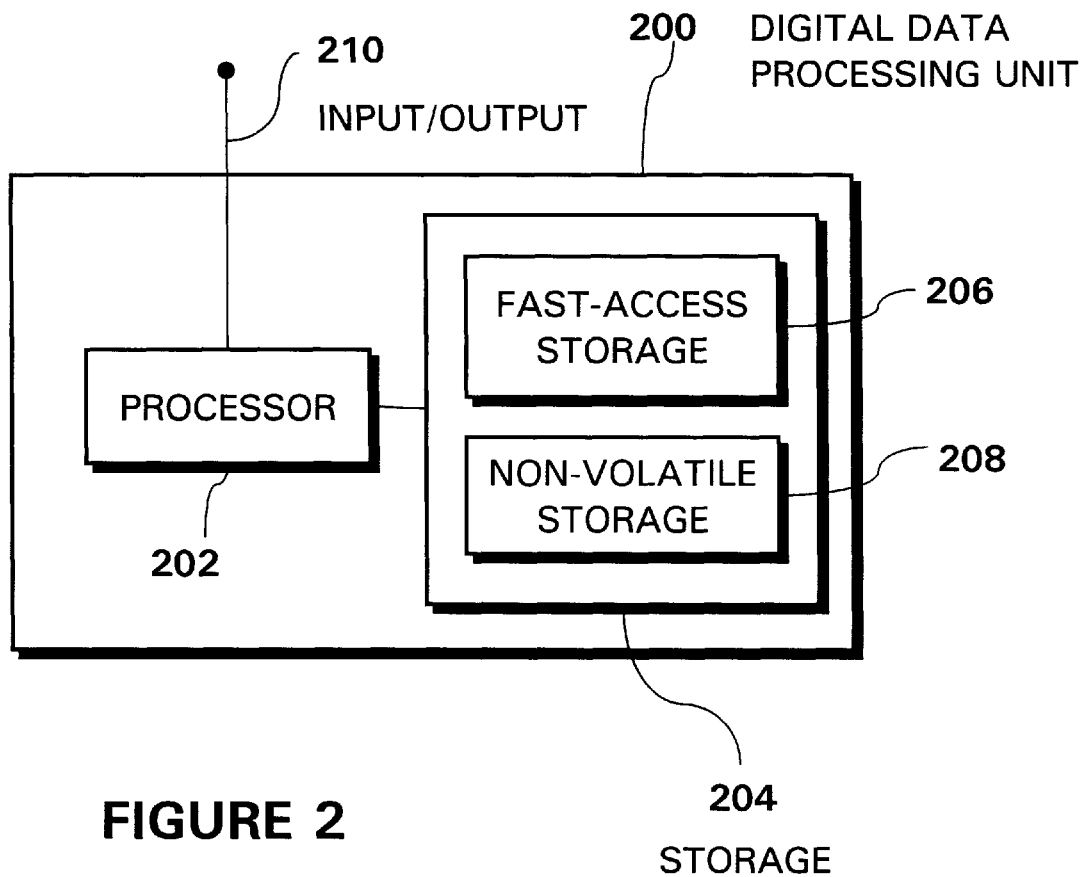
FIG. 2 is a block diagram of a digital data processing machine in accordance with the invention.

FIG. 2 shows an example of one digital data processing apparatus 200. The apparatus 200 includes a processor 202, such as a microprocessor or other processing machine, coupled to a storage 204. In the present example, the storage 204 includes a fast-access storage 206 as well as nonvolatile storage 208. The fast-access storage 206 may comprise random access memory, and may be used to store the programming instructions executed by the processor 202 during such execution. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method for operating an active calendar, which automatically performs various user-defined tasks appropriate to calendar entries. As one example, the calendar may analyze a user's calendar entries, search various sources for information related to the user's entries, filter the search results, and link the filtered information to the calendar entry, thereby aiding the user in his/her calendared activity. The active calendar may also automatically generate and transmit other machine-readable messages to destinations in support of the user's calendar entries.

Signal-Bearing Media

In the context of FIGS. 1–2, for example, such a method may be implemented by operating the processor 104, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to operate an active calendar, as explained below.

Figure 3:
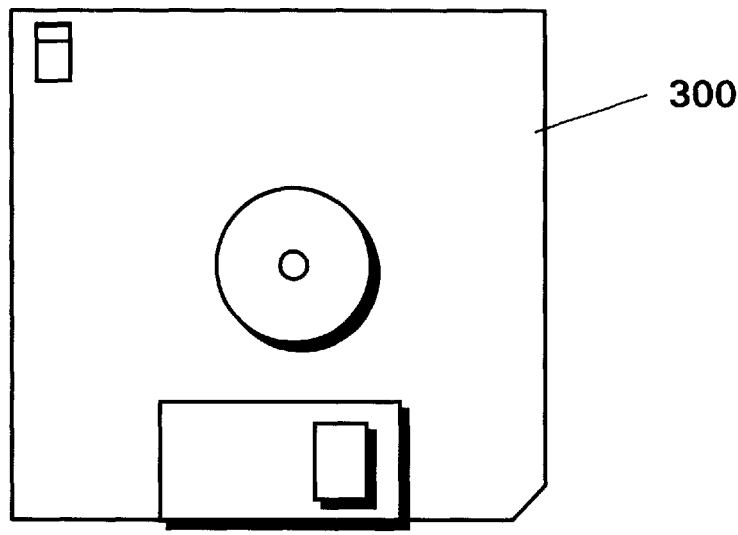
FIG. 3 shows an exemplary signal-bearing medium in accordance with the invention.

This signal-bearing media may comprise, for example, RAM (not shown) contained within the computer 102, as exemplified by the fast-access memory 206 of the apparatus 200. Alternatively, the instructions may be contained in another signal-bearing media, such as a magnetic data storage diskette 300 (FIG. 3), directly or indirectly accessible by the processor 104. Whether contained in the computer 102 or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, or digital optical tape), paper "punch" cards, or other suitable signal-bearing media including transmission media such as digital and analog and communication links and wireless. In an illustrative embodiment of the invention, the machine-readable instructions may comprise software object code, compiled from a language such as C++, etc.

Operational Components

Figure 4:
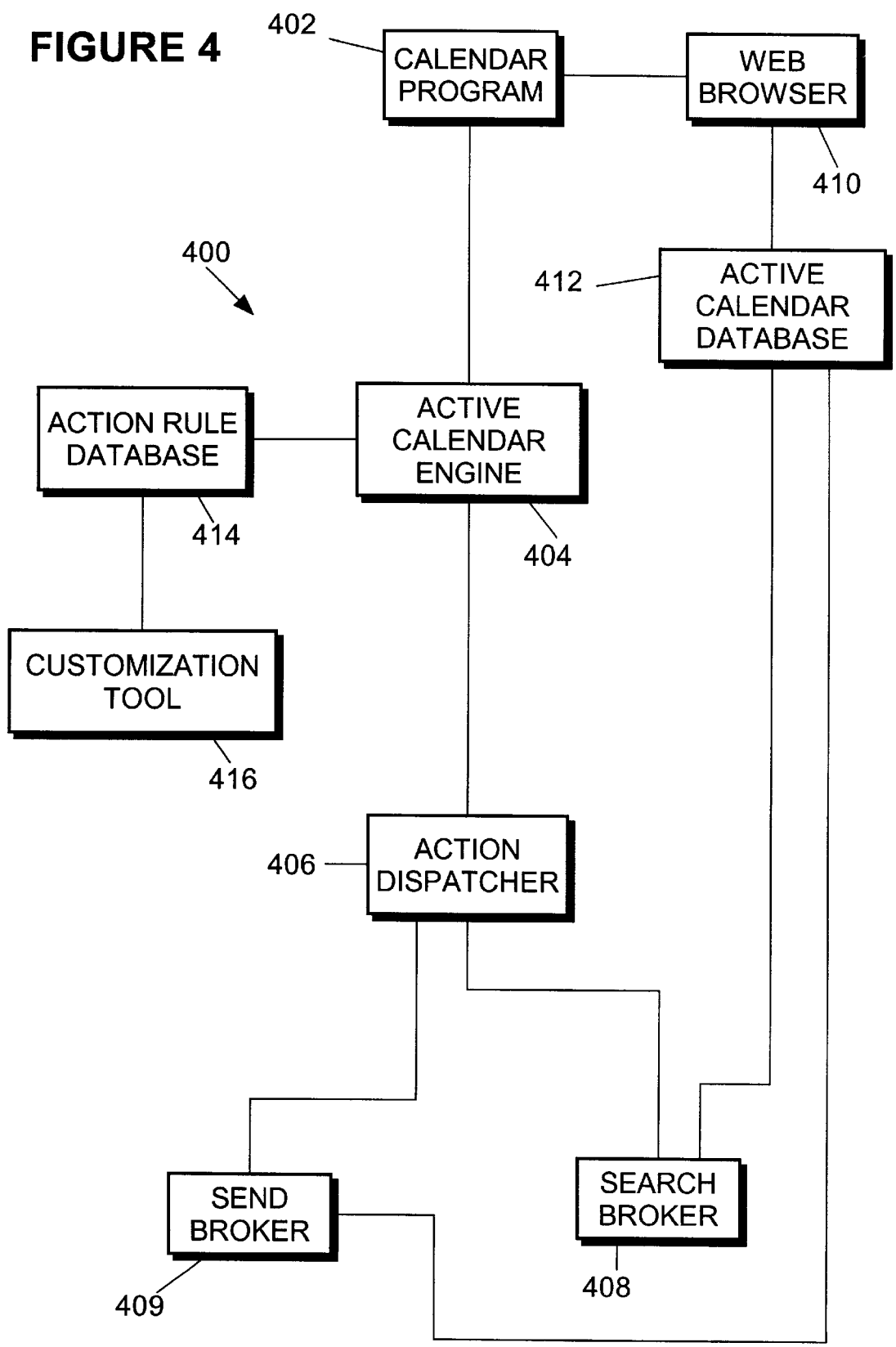
FIG. 4 is a block diagram of various operational subcomponents of the active calendar of the invention.

FIG. 4 depicts various operational components 400 of the processor 104 (FIG. 1), according to one example of the invention. In the illustrated example, the components 400 are provided by the processor 104 executing code, as discussed above. The components 400 cooperatively provide the functionality of the active calendar, which is described in detail below. Each component may be provided by a separate software module, subroutine, or other hardware or software subunit, or the modules may be provided by a contiguous code sequence, as will be apparent to ordinarily skilled artisans (having the benefit of this disclosure).

Referring to FIG. 4, one component is the calendar program 402, which comprises a calendar program that receives and records user submitted calendar entries describing planned events. The calendar program of the invention is configured, as discussed below, to associate each calendar entry with an event category and one or more subcategories. This may be performed independently, or with user assistance. Although the calendar program 402 may provide a thorough initial listing of event categories and subcategories, they may be extended to include additional event categories and/or subcategories defined by the user. As one example, the calendar program 402 may be based broadly on an application such as the LOTUS ORGANIZER program by IBM.

The active calendar engine 404 is the heart of the active calendar system, and may advantageously be compatible with a variety of other existing calendar programs in addition to the calendar program 402. The engine 404 monitors the user's original entry and subsequent updates of calendar entries. On an appropriate basis or schedule, the engine 404 automatically initiates actions appropriate to the corresponding calendar entry. Chiefly, such actions involve sending machine-readable messages in support of the calendar entry. These actions, such as message sending, may be performed immediately, periodically, whenever a new entry is added or an existing entry updated, or according to another schedule. The engine 404 first consults the action rule database 414 (described below) regarding a particular calendar entry to determine which message format is appropriate to that entry, consults the action rule database 414 to determine the message content and destination, and then directs the sending of the message.

The action dispatcher 406 is called by the active calendar engine 404 to trigger certain actions by the search broker 408 or send broker 409 appropriate to a calendar entry. This may involve the action dispatcher 406 invoking necessary components of the computer 102, network system support, or another suitable facility.

The search broker 408 conducts information searches using the various sources available to the computer 102. As mentioned above, these sources may include sources internal to the computer 102 as well as remote sources. For example, information searches may target local file systems, databases, other calendars, the Internet, etc. Based upon the information in a calendar entry, the search broker 408 decides where to search and what to search for. An exemplary search broker is described in the following publication, which is incorporated herein by reference: U. Manber et al., "The Search Broker," USENIX Symposium on Internet Technologies and Systems, Dec. 8–11, 1997, pages 231–239. In some cases, searches may be ultimately executed by sending machine-readable messages including various search parameters to destinations such as search engines.

The send broker 409 transmits machine-readable messages to various non-search destinations accessible to the computer 102. Based upon the information in a calendar entry, the send broker 409 determines message content and identifies one or more appropriate recipients. For example, the search broker 409 may transmit a message to an automated reservation system to request use of a conference room, send a message to a printer to print various records for the user, send a message to a component of the computer 102 to execute a particular code sequence, etc.

The web browser 410 may be a new or known web browser. Some examples include the MICROSOFT INTERNET EXPLORER 4.0 browser and the NETSCAPE NAVIGATOR browser. In the illustrated example, the active calendar presents information from its search to the user by various hyperlinks displayed by the web browser 410. The active calendar database 412 stores and manages the information collected by the search broker 408, and may use an appropriate system such as a hierarchical file system structure or database.

The action rule database 414 records a collection of rules that specify which tasks to perform for each type of calendar entry. Illustratively, the action rule database 414 pre-associates each event category with one or more message "formats", representing a particular message to be sent in support of calendar entries of that event category. Some exemplary message formats include search requests for internet search browsers, e-mail messages, printer commands, messages to an electronic sub-component of the user's computer, or another machine-readable message.

Each message format has a destination and a content. The action rule database 414 specifies how the destination and content are determined for each message. This information may be (1) stored in records of the action rule database 414 itself, (2) contained in subparts of the related calendar entry, identified by the action rule database 414, (3) contained in another database, such as the lists in the storage 106, or (4) a combination of the foregoing. For example, if the user is working late, the related message format may specify sending a message to the user's spouse (i.e., the destination, found in the e-mail address list 114 with the list 114 being identified by the action rule database 414) explaining that the user is working late (content, as identified by the action rule database 414 with specific content imported from the calendar entry). As another example, with a travel event category, the related message format may specify sending a message to an internet search engine (destination, obtained from records of the action rule database 414) requesting hotel information about the destination city (content, specified in particular fields of the calendar entry itself that are identified by the action rule database 414).

In a different illustration, the actions required by each event category may be considered "tasks" (also called "actions") classified as: (1) searching for information, invoked by sending one or more machine-readable messages to information sources, and/or (2) sending other types of messages. A "search for information" action invokes the search broker 408 to search various sources for information pertinent to the calendar entry.

The "send message" task invokes the send broker 409 to send a machine-readable message to an appropriate destination; one example is the sending of an e-mail to a person appropriate to that calendar entry. As illustrated, then, the action rule database 414 determines which of these actions to invoke for a given calendar entry. The customization tool 416 provides a means for customizing the action rule database 414 available to users, application developers, etc.

Figure 5:
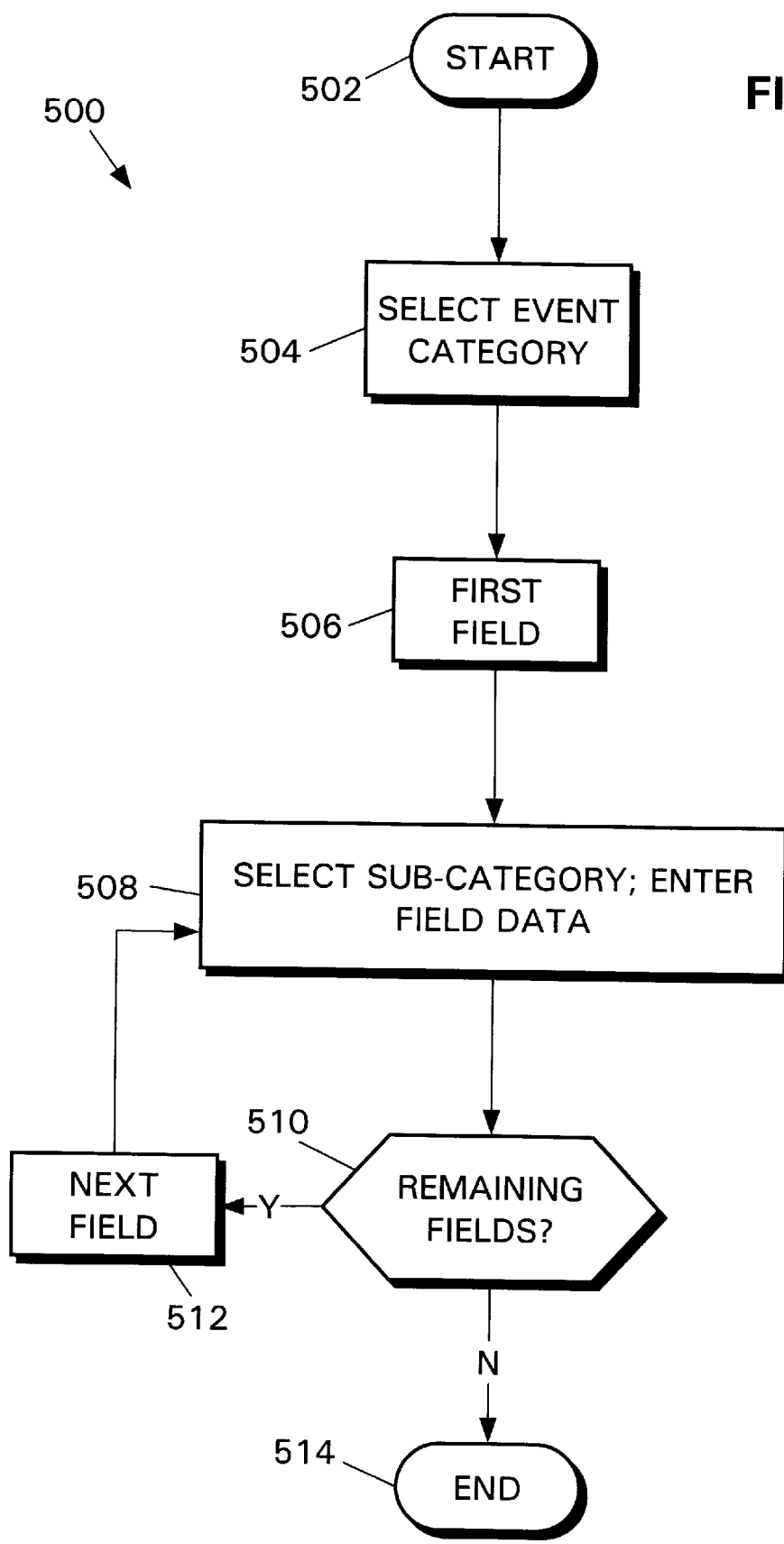
FIG. 5 is a flowchart showing an operational sequence for user entry of data into an active calendar in accordance with the invention.
Figure 6:
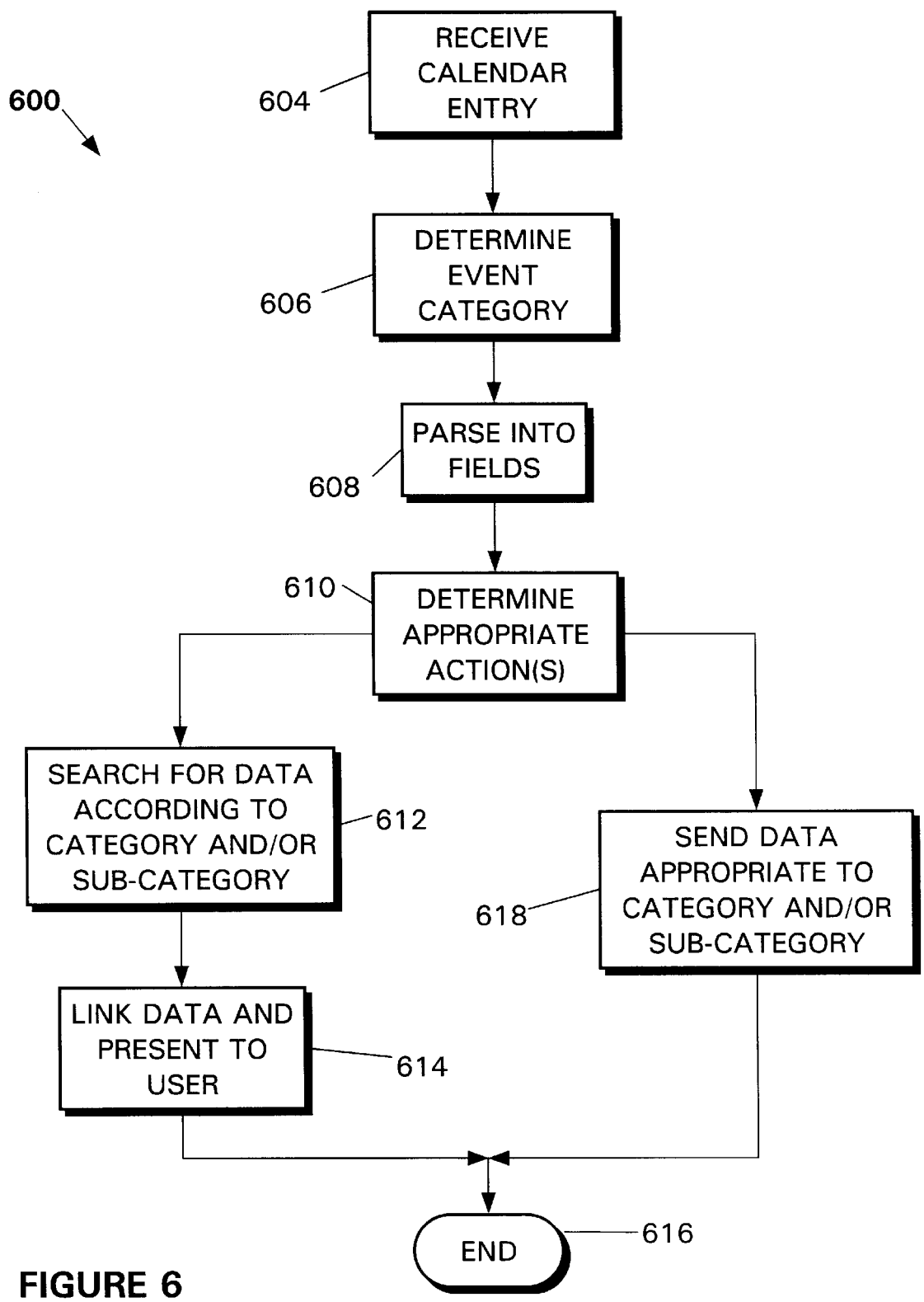
FIG. 6 is a flowchart showing a sequence of active calendar operation in accordance with the invention.

The operation and interrelation of the components 400 are described in greater detail in FIGS. 5–6, which detail operational sequences for user entry of calendar data and active calendar processing of such entries, respectively.

Entry of Calendar Data

FIG. 5 shows a sequence of method steps 500 to illustrate the entry of information into the active calendar of the invention. For ease of explanation, but without any limitation intended thereby, the example of FIG. 5 is described in the context of the system 100 (FIG. 1) and components 400 (FIG. 4) described above. In this example, the steps 500 are performed by interaction of the user (not shown) and the calendar program 400. In the specific embodiment of FIG. 5, user entry of calendar data is "structured," since the user enters data into fields, and manually associates each field with one subcategory appropriate to the event category of the relevant calendar entry.

The steps 500 are initiated in step 502, which may be performed by the user "clicking" on an active calendar icon, or if already running the active calendar program, choosing an event entry icon or menu selection. Following step 502, the calendar program 400 permits the user to select an event category in step 504. In the illustrated example, event categories are provided as shown in Table 1, below.

TABLE 1

Event Categories

Travel
Children's Activity
Meeting
Shopping
Two-party Telephone Call
Teleconference
Interview
Sales Call
Recreational Event (e.g., football game)
Social Event (e.g., dance)

Although this example uses the specific event categories of Table 1, a different assortment of event categories may be used, to suit the user. Furthermore, the user may expand, modify, or otherwise customize the list of event categories via the calendar program 402. As an example, the calendar program 402 may provide a GUI tool for the user to add, delete, and edit event categories and subcategories. The calendar program 400 stores a record associating the current calendar entry with the user-selected event category of step 504.

After step 504, the calendar program 400 assists the user in completing the current calendar entry, beginning with a first field, as shown by step 506. In step 508, the user selects a subcategory for the first field, and then enters the data of that field. As an example, step 508 may be implemented by user-activated menu selection, or by the calendar program 400 prompting the user. In the illustrated examples, the active calendar recognizes the subcategories shown below in Table 2.

TABLE 2

| EVENT CATEGORY | Subcategories | | | |
|---|---|---|---|---|
| | SUBCATEGORIES | | | |
| TRAVEL EVENT | Source City | Departure Date and Time | Destination City | Return Date/ Time |
| CHILD'S ACTIVITY EVENT | Date and Time | Activity | Participants | |
| MEETING EVENT | Date and Time | Location | Participants | |
| SHOPPING EVENT | Date and Time | Items Sought | Shopping Venue | |

TABLE 2-continued

| EVENT CATEGORY | Subcategories | | | |
|---|---|---|---|---|
| | SUBCATEGORIES | | | |
| VACATION EVENT | Dates | Participants | Destination City | Planned Events |
| TELE-CONFERENCE EVENT | Date and Time | Participants | | |

Step 508 also entails the calendar program 400 storing a record associating the calendar entry with the user's subcategory selection.

After step 508, the calendar program 400 determines whether there any remaining fields to be completed (step 510). This may be dictated by a predetermined number of fields associated with the relevant event category, or by the number of fields the user desires to complete without any prescribed limitation. As long as there are more fields to fill-in, step 512 advances to the next field and returns to step 508, described above. Otherwise, if all fields have been completed, the calendar entry is complete and step 510 advances to step 514, which ends the routine 500.

As an alternative to the "structured" data entry of the routine 500, the user may submit a "freestyle" calendar entry without any selection of event category and subcategory. In this embodiment, the calendar program 402 includes appropriate utility, such as word association programming or semantic analysis, to interpret the calendar entry in view of predefined menu of event categories and subcategories. Thus, in this embodiment, the calendar program 402 analyzes the vocabulary used in the calendar entry to decide which of the event categories and subcategories the user intended. The calendar program 400 may choose event category and subcategories according to this analysis without any user input; alternatively, the program 400 may generate a list of likely candidates and prompt the user to select from the list.

According to one embodiment of "freestyle" calendar entry, the calendar program 402 may recognize certain words used to classify calendar entries into event categories and subcategories. For instance, the program 400 may be configured to recognize any of the phrases "visit," "trip to," and "travel to," and automatically associate such a calendar entry with the "travel" event category. Likewise, phrases such as "meet," "see," and "meeting" may be automatically associated with the "meeting" event category. Once an event category has been determined, further word association analysis may be performed to determine the likely contents of each prescribed field of that event category.

Processing of Calendar Entries

After the user enters calendar information, the invention's active calendar performs certain user-defined tasks for each calendar entry. In the broadest sense, each pre-defined task involves sending a message having a certain content to a particular destination. The message content and destination are input parameters to the message, and are obtained by consulting the action rule database 414. More particularly, the message content and destination may be obtained from the action rule database 414 itself, from the fields of the calendar entry, from another source identified by the action rule database, or from a combination of the foregoing. Some exemplary messages are shown below in Table 3.

TABLE 3

Exemplary Messages

| MESSAGE FORMAT | MESSAGE CONTENT | MESSAGE DESTINATION |
| --- | --- | --- |
| internet search | search terms, from fields of a calendar entry | search engine, prescribed by action rule database |
| e-mail | language prescribed by action rule database, supplemented with relevant facts from calendar entry | e-mail addresses, obtained from user address list by action rule database according to content of calendar entry |
| print message | print command, stored in action rule database with print parameters derived from content of calendar entry | printer id, named in storage of action rule database |
| execution of code sequence | executable file name, stored in active rule database | operating system of user's computer, identified by action rule database |

To describe a more particular embodiment, FIG. 6 shows a sequence of method steps 600 as an example to illustrate the processing of information already entered into the active calendar of the invention. For ease of explanation, but without any limitation intended thereby, the example of FIG. 6 is described in the context of the sequence 500 (FIG. 5), the system 100 (FIG. 1), and the components 400 (FIG. 4), as described above. The steps 600 are initiated in step 604, which occurs when a user originally submits or modifies a calendar entry using the calendar program 400. This calendar entry is referred to as the "current" entry. The routine 600 may be started according to any suitable schedule, such as immediately upon user submittal of the calendar entry, after some delay, periodically without regard to the time of user input, etc.

After step 604, the active calendar engine 404 determines the event category in step 606. In the case of "structured" data entry, the event category is determined by recalling the recorded user selection of event category, previously made in step 504. In the alternative embodiment using "freestyle" data entry, step 606 is performed by techniques such as word association, semantic analysis, etc., as described above.

After step 606, the active calendar engine 404 parses the current calendar entry into its constituent fields. In the case of "structured" data entry, this is performed by recalling the recorded subcategories, which the user selected step-by-step during successive performance of step 508. Alternatively, where "freestyle" data entry is used, step 608 is performed by techniques such as word association, described above.

After step 608, step 610 begins to more specifically process the calendar entry. Namely, the active calendar engine 440 consults the action rule database 414 to determine which actions to take for the current calendar entry. In the illustrated example, the action rule database 414 dictates two possible types of tasks for each calendar entry: (1) search for information and (2) send message. These actions are executed by transmitting machine-readable messages of appropriate content to various destinations. The relationship between appropriate actions and event categories is maintained by the action rule database 414, and may be defined in whole or in part by the user.

If data of the current entry requires one or more "search information" actions, steps 612–614 are performed for each action. In step 612, the action dispatcher 406 directs the search broker 408 to execute the search. In the illustrated example, the search broker 408 consults the action rule database 414 to determine the appropriate search tasks and parameters for each different event category. More particularly, the action rule database 414 prescribes each search to be done for a particular event category, and correlates the necessary input parameters for each search with data from the fields of the calendar entry.

As an example, for the "travel" category, the action rules database 414 may dictate "search" actions to obtain:

1. all flights from the city listed in the "source city" field to the city listed in the "destination city" field.
2. a listing of hotels in the destination city.
3. a listing of restaurants in the destination city.
4. a weather forecast for the destination city between the "departure date and time" and the "return date and time."
5. a television listing for the destination city between the departure and return times.
6. an entertainment guide for the destination city.

Advantageously, the search actions may be customized according to the user's preferences, by adding, deleting, and modifying the prescribed search actions for each subcategory as stored in the action rule database 414. Such customization is performed by the customization tool 416.

As another example, the action rules database 414 may cause the event category "meeting" to result in searches for (1) each meeting participant's WWW home page, telephone numbers, and e-mail address, and (2) information concerning the meeting location, including address, driving directions, driving map, and telephone number.

The search broker 408 may also consult a stored user-configured list to identify specific sources of information to use for each type of search. In the case of a search for information about a meeting participant, for example, the search broker 408 may be configured to search the user's personal address book 112, EUDORA e-mail recipient list 114, and the specific WWW search engines HOT BOT, YAHOO, and FOUR ONE. In the case of another event category, it may be appropriate to search through a different combination of Internet web pages, internal data 106, and/or direct link sources 122.

The search broker 408 also filters information obtained by the search to eliminate information that is redundant, irrelevant, or otherwise unhelpful. In step 614, the search results are stored by the active calendar database 412. Also, information represented by the search results is made accessible to the user by links to such data. This may involve actually gathering the underlying data and storing some or all of it locally on the computer 102, providing hyperlinks to off-site locations where the data is stored, or a combination of these techniques. In the illustrated example, the search results are made available to the user by the web browser 410, which displays hyperlinks to the relevant sources, whether they reside on the WWW, storage 106, or another location.

In contrast to steps 612 and 614, with a "send message" action, step 610 leads to step 618, where the action dispatcher 406 directs the send broker 409 to send a machine-readable message. Step 618 is repeated for each message format that is required for the current event category, as specified by the action rule database 414. In the illustrated example, the send broker 409 consults the action rule database 414 to determine the appropriate message formats and parameters for each different event category. More particularly, the action rule database 414 prescribes each message to be sent for a particular event category, and correlates the destination and message content for each message with appropriate information sources, e.g., records of the action rule database 414 itself, fields of the calendar entry, other sources such as the storage 106 (such as a personal address book), or a combination of these sources.

When invoked in step 618, the send broker 409 causes an appropriate component of the user's computer 102 to send the message. Message parameters include a content and destination, both of which are obtained as discussed above. Messages may take a variety of forms, and may be directed to a variety of destinations. Taking a calendar entry under the "meeting" event category as one example, some-typical messages might include: (1) sending an e-mail or other electronic message to meeting participants and an automated conference room scheduler, (2) sending a command to a printer to print prior meeting minutes, (3) sending a command to the processor 104 to compile and execute a code sequence, the results of which are subject to discussion in the meeting, and (4) any other user-defined machine-readable message transmission. Accordingly, the message of step 618 may be sent to a variety of locations, such as the Internet 120 (e.g., e-mail), direct link sources 122, components internal to the computer 102, other computers attached to a common network, etc. Moreover, information may be sent by many different means and associated formats, such as Internet e-mail, LAN mail, hardwired connection, facsimile, or data link.

In the illustrated example, the send broker 409 consults the action rule database 414 to determine the appropriate "send message" actions for each different event category. Furthermore, the action rule database 414 may also specify delivery times for different types of messages. Advantageously, the send broker 409 may consult a user-configured list to identify specific message delivery systems appropriate for each type of "send message" action. In the case of a "send message" action regarding a meeting, for example, the send broker 409 may be configured to send Internet e-mail to each meeting participant.

After steps 614 and 618 are complete, the routine 600 ends in step 616.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer implemented method for processing an appointment entry of a computerized calendar that includes predetermined event categories classifying anticipated calendar appointment entries, said calendar also including an action rule database having (1) data pre-associating each event category with one or more predetermined message formats, each message format having a content and a destination, and (2) data identifying information sources containing the content and destination for each message format the sources including records of the action rule database and subparts of calendar appointment entries of the pre-associated event category, the method comprising:

automatically in response to user completion of a computer calendar appointment entry describing a planned event, the computerized calendar automatically analyzing contents of the completed calendar entry to identify one of the predetermined event categories classifying the planned event;

for each message format pre-associated with the identified event category the computerized calendar performing operations comprising:

determining content and destination for the message as specified in the action rule database; and transmitting a machine-readable message having the determined content to the determined destination.

2. The method of claim 1, the determining of the content and destination for the message comprising:

consulting the action rule database and in response retrieving one or more of the content and destination from records of the action rule database.

3. The method of claim 1, the determining of the content and destination for the message comprising:

consulting the action rule database and in response obtaining one or more of the content and destination from data in the calendar appointment entry.

4. The method of claim 1, the determining of the content and destination for the message comprising:

consulting the action rule database to identify a target database and obtaining one or more of the content and destination from the target database.

5. The method of claim 1, the identifying of one of the event categories being performed by applying a computer-implemented analysis to contents of the calendar appointment entry.

6. The method of claim 5, the analysis comprising providing a group of probable event categories to a user and obtaining user input to identify a single one of the event categories.

7. The method of claim 1, the identifying of one of the event categories comprising receiving identification of an event category from the user substantially concurrently with the user's submittal of the calendar appointment entry.

8. The method of claim 1, there being one or more subcategories pre-associated with each event category, the method further comprising identifying a number of fields of the calendar appointment entry, each field being associated with a different one of the subcategories of the identified event category.

9. The method of claim 1, the message formats including at least one of the following: a search for information, an e-mail message, and a processing instruction tailored to one or more subcomponents of a computer running the calendar, a processing instruction tailored to one or more peripheral components coupled to the computer running the calendar.

10. The method of claim 1, the transmitted message comprising a request to search for information, the message content including search parameters, and the message destination including a search engine.

11. The method of claim 10, the method further comprising:

the requested search completing; and linking the calendar appointment entry to any information found by the search.

12. The method of claim 11, the linking comprising hyperlinking the calendar appointment entry to information found by the search.

13. A signal-earing medium tangibly embodying a program of machine-readable instructions executable by a digital processing apparatus to perform a method for processing an appointment entry of a computerized calendar that includes predetermined event categories classifying anticipated calendar appointment entries and an action rule database having (1) data pre-associating each event category with one or more predetermined message formats, each message format having a content and a destination and (2) data identifying information sources containing the content and destination for each message format, the sources including records of the action rule database and subparts of calendar appointment entries of the pre-associated event category, the method comprising:

automatically in response to user completion of a computer calendar appointment entry describing a planned event, the computerized calendar automatically analyzing contents of the completed calendar entry to identify one of the predetermined event categories classifying the planned event;

for each message format pre-associated with the identified event category, the computerized calendar performing operations comprising:
determining content and destination for the message as specified in the action rule database; and
transmitting a machine-readable message having the determined content to the determined destination.

14. The medium of claim 13, the determining of the content and destination for the message comprising:
consulting the action rule database and in response retrieving one or more of the content and destination from records of the action rule database.

15. The medium of claim 13, the determining of the content and destination for the message comprising:
consulting the action rule database and in response obtaining one or more of the content and destination from data in the calendar appointment entry.

16. The medium of claim 13, the determining of the content and destination for the message comprising:
consulting the action rule database to identify a target database and obtaining one or more of the content and destination from the target database.

17. The medium of claim 13, the identifying of one of the event categories being performed by applying a computer-implemented analysis to contents of the calendar appointment entry.

18. The medium of claim 17, the analysis comprising providing a group of probable event categories to a user and obtaining user input to identify a single one of the event categories.

19. The medium of claim 13, the identifying of one of the event categories comprising receiving identification of an event category from the user substantially concurrently with the user's submittal of the calendar appointment entry.

20. The medium of claim 13, there being one or more sub-categories pre-associated with each event category, the method further comprising identifying a number of fields of the calendar appointment entry, each field being associated with a different one of the subcategories of the identified event category.

21. The medium of claim 13, the message formats including at least one of the following: a search for information, an e-mail message, and a processing instruction tailored to one or more subcomponents of a computer running the calendar, a processing instruction tailored to one or more peripheral components coupled to the computer running the calendar.

22. The medium of claim 13, the transmitted message comprising a request to search for information, the message content including search parameters, and the message destination including a search engine.

23. The medium of claim 22, the method further comprising:
the requested search completing; and
linking the calendar appointment entry to any information found by the search.

24. The medium of claim 23, the linking comprising hyperlinking the calendar appointment entry to information found by the search.

25. A computer-implemented active calendar, comprising:
a storage; and
a processor, coupled to the storage, the processor programmed to perform steps for processing an appointment entry of a computerized personal calendar that includes predetermined event categories classifying anticipated calendar appointment entries, the calendar also including an action rule database having (1) data pre-associating each event category with one or more predetermined message formats, each message format having a content and a destination and (2) data identifying information sources containing the content and destination for each message format, the sources including records of the action rule database and subparts of calendar entries of the pre-associated event category, the steps comprising:
automatically in response to user completion of a computer calendar appointment entry describing a planned event, the computerized calendar automatically analyzing contents of the completed calendar entry to identify one of the predetermined event categories classifying the planned event;
for each message format pre-associated with the identified event category, the computerized calendar performing operations comprising:
determining content and destination for the message as specified in the action rule database; and
transmitting a machine-readable message having the determined content to the determined destination.

26. The calendar of claim 25, the determining of the content and destination for the message comprising:
consulting the action rule database and in response retrieving one or more of the content and destination from records of the action rule database.

27. The calendar of claim 25, the determining of the content and destination for the message comprising:
consulting the action rule database and in response obtaining one or more of the content and destination from data in the calendar appointment entry.

28. The calendar of claim 25, the determining of the content and destination for the message comprising:
consulting the action rule database to identify a target database and obtaining one or more of the content and destination from the target database.

29. The calendar of claim 25, the identifying of one of the event categories being performed by applying a computer-implemented analysis to contents of the calendar appointment entry.

30. The calendar of claim 29, the analysis comprising providing a group of probable event categories to a user and obtaining user input to identify a single one of the event categories.

31. The calendar of claim 25, the identifying of one of the event categories comprising receiving identification of an event category from the user substantially concurrently with the user's submittal of the calendar appointment entry.

32. The calendar of claim 25, there being one or more subcategories pre-associated with each event category, the method further comprising identifying a number of fields of the calendar appointment entry, each field being associated with a different one of the subcategories of the identified event category.

33. The calendar of claim 25, the message formats including at least one of the following: a search for information, an e-mail message, and a processing instruction tailored to one or more subcomponents of a computer running the calendar, a processing instruction tailored to one or more peripheral components coupled to the computer running the calendar.

34. The calendar of claim 25, the transmitted message comprising a request to search for information, the message content including search parameters, and the message destination including a search engine.

35. The calendar of claim 34, the method further comprising:

the requested search completing, and linking the calendar appointment entry to any information found by the search.

36. The calendar of claim 35, the linking comprising hyperlinking the calendar appointment entry to information found by the search.

37. A digital data processing machine, comprising:

means for storing digital data; and processing means, coupled to the means for storing digital data, for processing an appointment entry of a computerized personal calendar that includes predetermined event categories classifying anticipated calendar appointment entries and an action rule database having (1) data pre-associating each event category with one or more predetermined message formats, each message format having a content and a destination and (2) data identifying information sources containing the content and destination for each message format, the sources including records of the action rule database and subparts of calendar appointment entries of the pre-associated event category, the entry being processed by:

automatically in response to user completion of a computer calendar appointment entry describing a planned event, the computerized calendar automatically analyzing contents of the completed calendar entry to identify one of the predetermined event categories classifying the planned event;

for each message format preassociated with the identified event category, the computerized calendar performing operations comprising:

determining content and destination for the message as specified in the action rule database; and transmitting a machine-readable message having the determined content to the determined destination.

38. A computer implemented method for processing an appointment entry of a computerized calendar, comprising:

establishing predetermined event categories classifying anticipated calendar appointment entries;

constructing an action rule database including:

data pre-associating each event category with one or more predetermined message formats, each message format having a content and a destination; and data identifying information sources containing the content and destination for each message format, the sources including records of the action rule database and subparts of calendar appointment entries of the pre-associated event category;

automatically in response to user completion of a computer calendar appointment entry describing a planned event, the computerized calendar automatically analyzing contents of the completed calendar entry to identify one of the predetermined event categories classifying the planned event;

for each message format pre-associated with the identified event category, the computerized calendar performing operations comprising:

determining content and destination for the message as specified in the action rule database; and transmitting a machine-readable message having the determined content to the determined destination.

39. A method for providing a computer calendar system, comprising machine-executed operations of:

detecting user entry of a computer calendar appointment describing a future event;

automatically in response to user entry of the computer calendar appointment, performing operations comprising:

analyzing contents of the appointment to identify one event category, in a group of predetermined event categories, classifying the planned event;

consulting a database to identify one or more message types pre-associated with the identified event category, where said database pre-associates each event category with one or more predetermined message types;

for each identified message type, performing operations comprising:

consulting a database to identify one or more information resources, where said database pre-associates each message format with one or more predetermined information resources;

utilizing the identified information sources to determine content and destination for the message;

transmitting a machine-readable message having the determined content to the determined destination.

* * * * *